United States Patent [19]

Erskine

[11] 3,981,513

[45] Sept. 21, 1976

[54] STEERING AXLE ASSEMBLY

[75] Inventor: Douglas W. Erskine, Homewood, Ill.

[73] Assignee: Allis-Chalmers, Rumely, Ltd., Guelph, Canada

[22] Filed: May 27, 1975

[21] Appl. No.: 581,123

[52] U.S. Cl. .............................................. 280/95 R
[51] Int. Cl.² ........................................... B62D 7/06
[58] Field of Search ............ 280/93, 95 R; 180/43 R

[56] References Cited
UNITED STATES PATENTS

| | | | |
|---|---|---|---|
| 2,187,197 | 1/1940 | Dunham | 280/95 R |
| 2,356,164 | 8/1944 | Keese | 280/95 R X |
| 2,908,241 | 10/1959 | Todd | 180/43 R |
| 2,917,123 | 12/1959 | Ainsworth | 180/43 R |
| 3,255,839 | 6/1966 | Goldman | 180/43 R |

Primary Examiner—M. H. Wood, Jr.
Assistant Examiner—Terrance L. Siemens
Attorney, Agent, or Firm—Robert C. Sullivan

[57] ABSTRACT

A steering axle assembly for a vehicle in which the steering arm is secured to and imparts rotary angular steering movement to the steering spindle about a king pin mounted on a transverse axle of the vehicle and also serves as a cover for the upper end of the steering spindle. In its structural relation as a cover member firmly engaged with the upper end of the angularly rotatable steering spindle, the steering arm also serves as a retainer and adjusting means for a pair of tapered roller bearing assemblies at the upper and lower ends of the king pin. A further feature of the construction is that the king pin is easily removable from the assembly for maintenance or replacement.

5 Claims, 2 Drawing Figures

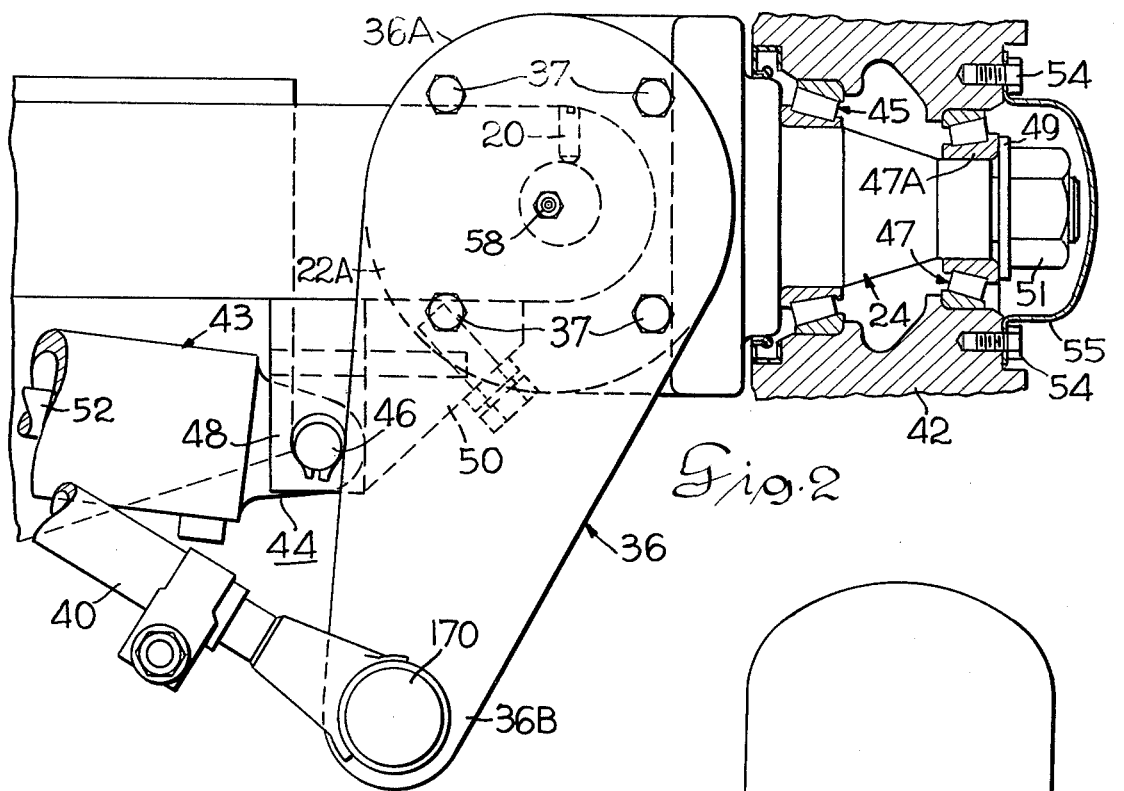
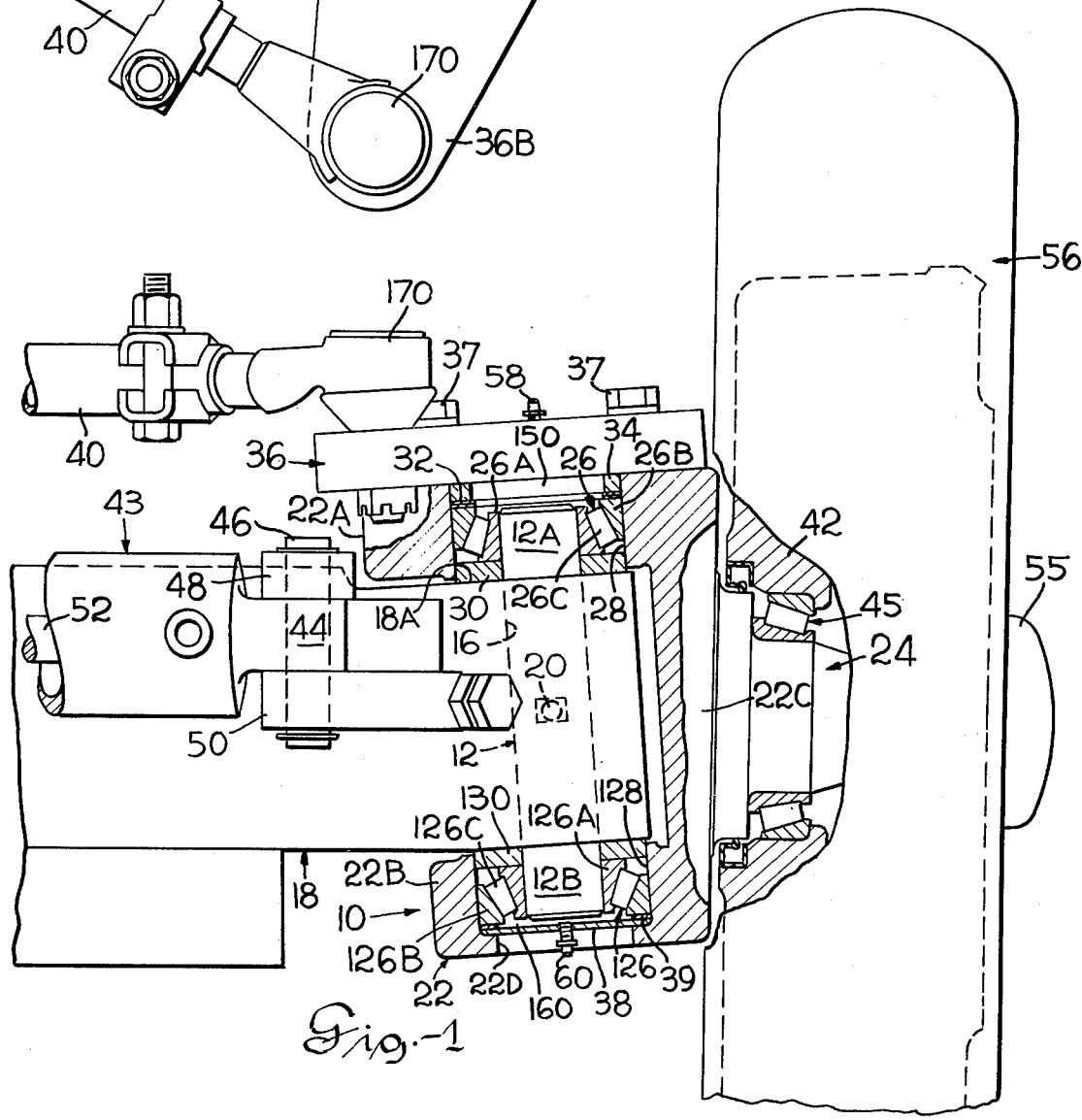

STEERING AXLE ASSEMBLY

BACKGROUND OF THE INVENTION

Field of the Invention

This invention relates to a steering axle assembly for a vehicle, and more particularly to a steering axle assembly having a steering arm which in addition to its usual function of imparting a steering movement to the steering spindle and the stub axle carried by the steering spindle also serves as a cover member, a bearing retainer, and a bearing adjusting means for the steering axle assembly.

The steering axle assembly has particular utility for use in a vehicle such as a fork lift truck, but is not restricted to use in any particular type of vehicle.

STATEMENT OF THE INVENTION

Accordingly, it is an object of the present invention to provide a steering axle assembly for vehicles in which the steering arm in addition to performing its usual function of imparting a turning steering movement to the steering spindle and its associated stub axle about a fixed king pin also serves as a cover member at the normally upper end of the steering axle assembly.

It is another object of the invention to provide a steering axle assembly for vehicles in which the steering arm which imparts steering movement to the steering spindle and stub axle associated therewith also serves as a retainer and adjusting means for the bearings between the fixed king pin and the steering spindle which is journalled on the king pin for angular steering movement relative to the fixed king pin.

It is a further object of the invention to provide a steering axle assembly for use in vehicles or the like in which the steering arm has a high degree of frictional contact with the normally upper end of the angularly rotatable steering spindle, whereby to provide a highly effective transmission of steering torque from the steering arm to the steering spindle which moves about the fixed king pin.

It is still another object of the invention to provide a steering axle assembly for vehicles, including a king pin normally securely fixed to a transverse axle of the vehicle, but with the king pin being easily removable from the transverse axle if required for maintenance or replacement.

It is a still further object of the invention to provide a steering axle assembly for a vehicle which is lower in cost and includes fewer parts than steering assemblies of the prior art.

In achievement of these objectives, there is provided in accordance with an embodiment of the invention a steering axle assembly for a vehicle in which the steering arm, which is secured to and imparts rotary angular steering movement to the steering spindle about a king pin mounted on a transverse axle of the vehicle, also serves as a cover member for the upper end of the steering axle assembly, whereby to serve as a cover for the upper end of the king pin, the steering spindle, and the tapered roller bearing assembly interposed between the king pin and the angularly rotatable steering spindle. In its structural relation as a cover member which is firmly engaged with the upper end of the angularly rotatable steering spindle, the steering arm also serves as a retainer and adjusting means for the tapered roller bearing assembly at the upper end of the steering axle assembly, and as an adjusting means for a tapered roller bearing assembly interposed between the king pin and the steering spindle at the lower end of the steering axle assembly. A further feature of the construction is that the king pin is easily removable from the assembly for maintenance or replacement.

BRIEF DESCRIPTION OF THE DRAWING

Further objects and advantages of the invention will become apparent from the following description taken in conjunction with the accompanying drawing, in which:

FIG. 1 is a view partially in vertical elevation and partially in section of a steering axle assembly in accordance with the invention; and FIG. 2 is a top plan view and partially sectional view of the assembly of FIG. 1.

DESCRIPTION OF THE PREFERRED EMBODIMENT

Referring now to the drawing, the steering axle assembly generally indicated at 10 includes a king pin generally indicated at 12 which extends through a passage 16 in an axle 18 which extends transversely of the longitudinal axis of the vehicle body. It will be understood that a steering axle assembly similar to that to be hereinafter described is provided at each of the opposite ends of the transverse axle 18 of the vehicle contiguous opposite lateral sides of the vehicle.

The king pin 12 is normally held fixed in position on transverse axle 18 by a set screw 20. King pin 12 may be removed from transverse axle 18 for maintenance or replacement, if necessary, by loosening set screw 20. The ends of king pin 12 project above and below the respective upper and lower surfaces of transverse axle 18, the upper and lower projecting ends being respectively designated as 12A and 12B.

Steering axle assembly 10 also comprises a steering spindle generally indicated at 22. As will be explained more fully hereinafter, steering spindle 22 is journalled for rotation through a predetermined rotary angle necessary for steering movement upon the respective upper and lower projecting ends 12A and 12B of king pin 12. Steering spindle 22 includes a pair of spaced upper and lower laterally extending flanges respectively designated at 22A and 22B which respectively are adapted to lie above and below the transverse axle 18 of the vehicle, and which flanges 22A and 22B are joined together by spindle body portion 22C which terminates at its outer or right-hand end relative to the views in the drawing in a stub axle generally indicated at 24. Upper spindle flange 22A is provided with an annular passage 28 therethrough, annular passage 28 being adapted to receive the tapered roller bearing assembly generally indicated at 26 and also to receive the upper projecting end 12A of king pin 12, as will be explained hereinafter in more detail.

Similarly, lower spindle flange 22B has an annular passage 128 therethrough in axial alignment with the similar annular passage 28 in upper spindle flange 22A. As will be explained more fully hereinafter, annular passage 128 in lower spindle flange 22B is adapted to receive the tapered roller bearing assembly generally indicated at 126 and the downwardly projecting end 12B of king pin 12.

The spaced flanges 22A and 22B extend in planes substantially parallel to each other and substantially perpendicularly to body portion 22C of steering spindle 22. The upper flange 22A of the steering spindle is journalled for rotation through a predetermined steering angle on upper projecting portion 12A of king pin 12 by means of tapered roller bearing assembly 26 interposed between king pin projecting end 12A and spindle flange 22A. Similarly, lower flange 22B of steering spindle 22 is journalled for rotation through a required steering angle on lower projecting end 12B of king pin 12 by means of tapered roller bearing assembly 126 interposed between end 12B of king pin 12 and spindle flange 22B. The tapered roller bearing assembly 26 interposed between upper end 12A of king pin 12 and upper flange 22A of steering spindle 22 comprises a tapered inner bearing race 26A which is fixed to the outer surface of upper end 12A of king pin 12 by a force fit or the like. A tapered outer bearing race or bearing "cup" 26B seats along the periphery of annular passage 28 of upper spindle flange 22A. Tapered bearing rollers 26C are interposed between the outer bearing races 26A and 26B. A spacer ring 30 surrounding upper end 12A of king pin 12 is interposed between upper surface 18A of transverse axle 18 and the under surface of inner bearing race 26A. An annular shim pack 32 is seated on the upper surface of outer bearing race 26B and an annular thrust collar or spacer ring 34 is seated on the upper surface of the annular shim pack 32. As an alternative, thrust collar on spacer ring 34 may be integral with and extend from the under surface of steering arm 36 to be described.

A steering arm generally indicated at 36 has an arcuate periphery 36A for part of its perimeter in overlying relation to the upper surface of upper spindle flange 22A and also in overlying relation to the upper surface of a portion of connecting body portion 22C of spindle 22. Steering arm 36 projects beyond the outer periphery of the flange 22A as indicated at 36B to provide an elongated lever arm by means of which steering movement may be imparted to spindle 22. The portion of steering arm 36 which overlies spindle 22 seats on the upper surface, relative to the views shown in the drawing, of spindle flange 22A of spindle 22 and of an upper portion of connecting body portion 22C of spindle 22, steering arm 36 being rigidly secured to the upper end of spindle 22 by means of a plurality of circumferentially spaced capscrews 37 as best seen in the view of FIG. 2. Thus it will be seen that steering arm 36 is so structurally related to steering spindle 22 as to constitute a cover member and a bearing retainer for the upper end of kin pin 12 and of steering spindle 22. As will be explained more fully hereinafter, the steering arm 36 not only serves as a bearing retaining means, but also as means for adjusting the preload or, alternatively, if desired, the end play of the tapered roller bearing assembly 26 at the upper end of the steering axle assembly, and for simultaneously adjusting the preload or, alternatively, the end play, of the tapered roller bearing assembly 126 at the lower end of the steering axle assembly.

A grease fitting 58 is provided in the portion of steering arm 36 which overlies spindle flange 22A to permit the injection of lubricating grease or other lubricant into the cavity 150 for the roller bearing structure 26 formed by the annular passage 28, the spacer 30 and the steering arm 36. The radially outer periphery of the spacer 30 is in confronting, sealing relation to the lower end of passage 28 so as to provide an effective lubricant seal.

At the lower end of the steering axle assembly, the tapered roller bearing assembly 126 which is interposed between the lower end 12B of king pin 12 and the lower spindle flange 22B comprises a tapered inner bearing race 126A which is axially fixed as by a press fit on lower end 12B of king pin 12. The tapered roller bearing assembly 126 also includes an outer bearing race 126B which seats on the peripheral surface of the annular passage 128 in lower spindle flange 22B. Tapered bearing rollers 126C are interposed between the inner and outer races 126A and 126B.

The respective tapered roller bearing assemblies 26 and 126 which have been described serve to carry the radial and thrust loads which are imposed on the steering axle assembly.

An annular spacer ring 130 126A interposed between the upper surface of inner bearing race 126 of tapered roller bearing assembly 126 and the under surface of transverse axle 18 of the vehicle.

The lower end of the lower spindle flange 22B is provided with a radially inturned flange 22D, and a sealing closure plate 38 seats on the upper surface of the annular shoulder defined by the inturned flange 22D. A grease fitting 60 is provided in closure plate 38 to permit the injection of grease or other lubricant into the cavity 160 for the tapered roller bearing assembly 126. The radially outer periphery of the spacer ring 130 is in confronting, sealing relation to the upper part of the annular passage 128 and together with the latter and closure plate 38 defines the bearing cavity 160. An annular spacer ring 39 is interposed between the upper surface of closure plate 38 and the under surface of outer bearing race 126B at the lower end of the steering axle assembly.

A tie rod 40 is suitably pivotally connected to the outer end of steering arm 36 by a ball and socket joint 170 whereby movement imparted to tie rod 40 by a steering mechanism, the details of which form no part of the invention, will cause the steering arm 36 and the spindle 22 to angularly move about the longitudinal axis of king pin 12, whereby stub axle 24 which is integral with or suitably attached to steering spindle 22 will move with steering spindle 22 to impart a steering movement to the wheel mounted on stub axle 24.

The means for imparting movement to tie rod 40 which in turn imparts movement to steering arm 36 and steering spindle 22 as just described forms no part of this invention but includes as part thereof a hydraulic cylinder generally indicated at 43 including a stub-like projection 44 which is suitably pivotally anchored by means of pin 46 to the members 48 and 50 which, in turn, are rigidly secured to transverse axle 18 of the vehicle. Piston rod 52 connected to a piston movable within cylinder 43 is suitably connected at its opposite end to a pivotally movable steering block (not shown) to which the opposite end of the tie rod 40 is also connected. Thus, movement of piston rod 52 under the influence of hydraulic fluid admitted to hydraulic cylinder 43 results in a mechanical movement which imparts movement to tie rod 40, the movement of tie rod 40, as previously explained, in turn imparting an angular movement to steering arm 36, whereby to impart an angular movement to steering spindle 22 about the longitudinal axis of king pin 12. Movement of steering spindle 22 about king pin 12 imparts movement to stub axle 24 on which the vehicle wheel is mounted, since stub axle 24 is integral with or part of steering spindle 22.

A hub member 42 is mounted for rotation on stub axle 24 by means of tapered roller bearing assemblies generally indicated at 45 and 47 spaced axially of stub shaft 24 and which will not be described in detail, whereby hub 42 is rotatably mounted on stub shaft 24. A washer 49 abuts against the axially outer end of inner race 47A of the axially outermost tapered roller bearing assembly 47, and a nut member 51 is in screw threaded engagement with the threaded end of stub shaft 24. A hub cap 55 is detachably secured to hub 42 by capscrews 54, to close the axially outer end of the passage in hub 42 which receives stub axle 24 and tapered roller bearing assemblies 45 and 47. A wheel rim having a tire 56 mounted thereon is suitably secured to wheel hub 42 and rotates therewith.

The portion of steering arm 36 which overlies and is secured by capscrews 37 to upper spindle flange 22A not only serves as an upper end closure and bearing retainer for the coaxially arranged king pin upper end 12A and of upper spindle flange 22A and the annular passage 28 in flange 22A, but in addition the attachment of steering arm 36 in the manner shown and described to the upper end of spindle 22 provides metal-to-metal contact between the mating surfaces of steering arm 36 and of spindle 22 whereby to provide steering torque transmission directly between steering arm 36 and steering spindle 22. Capscrews 37 by means of which steering arm 36 is secured to the upper end of spindle 22 serve principally to act in tension to keep the two mating frictionally engaged surfaces of steering arm 36 and of steering spindle 22 in frictional engagement with each other, and essentially the steering torque is not transmitted through capscrews 37.

The desired preload on or, alternatively, if desired, a desired end play of, the upper tapered roller bearing assembly 26 may be obtained by proper selection of the axial thickness of the shim pack 32 which is interposed between the under surface of thrust collar 34 and the upper surface of outer bearing race 26B. If the thickness of shim pack 32 is so selected as to provide a preload on tapered roller bearing assembly 26, the metal-to-metal engagement of steering arm 36 with thrust collar 34 will cause thrust collar 34 to maintain shim pack 32 in compression against outer bearing race 26B to provide the desired preload on the bearing assembly 26. If, in an alternative construction, thrust collar 34 is integral with or part of steering arm 36, pressure would be exerted against shim pack 32 in the same manner as just described to obtain the desired preload on the tapered roller bearing assembly 26.

With a given axial thickness of shim pack 32 at the upper end of the steering axle assembly, when steering arm 36 is tightened down into tight frictional engagement with the upper end of steering spindle 22 by means of capscrews 37, the outer bearing race 126B at the lower end of the steering axle assembly will move upwardly with spindle 22 which is being tightened into engagement with steering arm 36, and in so doing outer bearing race 126B will move axially upwardly relative to the interposed bearing rollers 126C, providing a preload, or, alternatively, if desired, an end play adjustment of the tapered roller bearing assembly 126 at the lower end of the steering axle assembly. In other words, when the steering arm 36 is secured to the spindle 22, both bearing assemblies 26, 126 are simultaneously adjusted to a predetermined preload or end play as determined by the axial thickness of shims 32.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A steering axle assembly for use on a vehicle, comprising a king pin extending through and secured to a transverse axle of the vehicle contiguous an end of the transverse axle, said king pin including opposite end portions thereof respectively extending above and below said transverse axle, a steering spindle comprising upper and lower flange members connected by a main body portion, said upper and lower flange members being respectively journalled for angular steering rotation about said end portions of said king pin which respectively extend above and below said transverse axle, a separate tapered roller bearing assembly interposed between each respective end portion of said king pin and the corresponding steering spindle flange, a stub axle carried by said main body portion of said steering spindle, said stub axle being adapted to support a wheel for rotation thereon, a steering arm having a portion thereof overlying and rigidly secured by threaded fastening means to the normally upper end of said steering spindle in covering relation to the normally upper end of said king pin and in covering relation to at least a portion of the normally upper end of said steering spindle, said steering arm being additionally in overlying covering relation to said tapered roller bearing assembly which is interposed between said upper flange member and the corresponding end portion of said king pin, and means interposed between the under surface of said steering arm and the upper surface of said last-mentioned tapered roller bearing assembly and acting in combination with the overlying connection of said steering arm to the upper end of said steering spindle whereby to simultaneously adjust the respective tapered roller bearing assembly which lies between each respective end portion of said king pin and the corresponding flange member of said steering spindle, said steering arm including a lever portion extending beyond said steering spindle to define a lever by means of which a steering torque is communicated to said steering spindle, said lever portion of said steering arm being adapted to be connected to link means for imparting a steering torque to said steering arm.

2. A steering axle assembly as defined in claim 1 in which said means interposed between the under surface of said steering arm and the upper surface of said last-mentioned tapered roller bearing assembly comprises shim means.

3. A steering axle assembly as defined in claim 1 in which said means interposed between the under surface of said steering arm and the upper surface of said last-mentioned tapered roller bearing assembly comprises a thrust collar.

4. A steering axle assembly as defined in claim 3 comprising shim means interposed between the under surface of said thrust collar and the upper surface of said last-mentioned tapered roller bearing assembly.

5. A steering axle assembly as defined in claim 1 in which the upward movement imparted to said steering spindle by the threaded engagement with said steering spindle of said threaded fastening means which secures said steering arm to said steering spindle imparts an adjusting movement to the tapered roller bearing assembly which is located between said lower flange member and said corresponding end portion of said king pin.

* * * * *